United States Patent [19]

Hobbs

[11] Patent Number: 4,857,818

[45] Date of Patent: Aug. 15, 1989

[54] ELECTRIC MOTOR BRAKE

[76] Inventor: Taz D. Hobbs, 600 Orange, LaMarque, Tex. 77568

[21] Appl. No.: 189,721

[22] Filed: May 3, 1988

[51] Int. Cl.[4] .............................................. H02P 3/24
[52] U.S. Cl. ..................................... 318/762; 318/760
[58] Field of Search ........................ 318/760, 761, 762

[56] References Cited

U.S. PATENT DOCUMENTS

| | | | |
|---|---|---|---|
| 2,784,364 | 3/1957 | Gertin | 318/760 |
| 2,929,977 | 3/1960 | Choudhury | 318/762 |
| 3,209,225 | 9/1965 | Choudhury | 318/762 |
| 3,398,343 | 8/1968 | Plumpe, Jr. | 318/762 |
| 3,809,979 | 5/1974 | Zarth | 318/762 |
| 4,195,255 | 3/1980 | Guttmann | 318/762 |
| 4,334,181 | 6/1982 | Schroeder . | |
| 4,450,397 | 5/1984 | Painter et al. | 318/762 |
| 4,514,677 | 4/1985 | Kaufmann et al. . | |
| 4,547,692 | 10/1985 | Spaulding . | |
| 4,560,913 | 12/1985 | Min . | |
| 4,612,490 | 9/1986 | Kagi . | |
| 4,736,146 | 4/1988 | Bettendorf | 318/762 |

*Primary Examiner*—David Smith, Jr.
*Attorney, Agent, or Firm*—Jerry T. Kearns

[57] ABSTRACT

The subject invention is an electric motor brake which uses a simplified circuit enabling a timed injection of DC voltage into the motor windings of an induction motor. This DC voltage acts as a dynamic braking force and will bring the rotor, and whatever is connected to it, to a stop in a rapid fashion. An additional advantage of the invention is that it may be constructed and used as a stand alone device which may be attached to any electrical induction motor to achieve the desired braking effect. A further feature of the invention is the provision of a timing circuit that it is designed to be user adjusted to achieve the maximum possible effect rather than using a fixed design which would result in a compromise in order to be suited for wide usage.

4 Claims, 3 Drawing Sheets

ELECTRIC MOTOR BRAKE

BACKGROUND OF THE INVENTION

1. Field of the Invention

The present invention relates to electric motor brakes, and more particularly pertains to the circuitry and apparatus necessary to implement such a device. Due to the dangers involved in the use of electric motors, and their inherent rotation inertia, it has long been desired to find a practical way to stop the rotation of the motor when the off switch is activated. The inherent danger comes from the devices the motors are attached to and not from the motors themselves. For example, many such motors are used to drive saws and other rotary cutting tools. The delay between the device being switched off and the blade actually stopping has led to many injuries and is a major safety problem in machine shops and home workshops throughout the United States and the world. This has led to the use of many different types of braking mechanisms over the years. These mechanisms are both electrical and mechanical in nature and involve a variety of approaches. These mechanisms have included the use of a physical brake on the motor shaft, and the use of a dynamic braking action in the motor winding. The applicant's invention involves the use of the dynamic braking action mentioned above, but in a novel and improved fashion. In order to make the device more versatile and therefore give it a wider range of application, applicant has designed the circuitry in such a way that the device may be adjusted to the particular device to achieve the maximum effect. The attendant benefit to the end user is that the device will have the optimum amount of braking for the particular circumstances and yet will still adaptable, if needed, to a change in the working environment.

2. Description of the Prior Art

Various types of electric motor brakes are known in the prior art. A typical example of such an electric motor brake is to be found in U.S. Pat. No. 4,334,181 which issued to Dale W. Schroeder on June 8, 1982, and discloses the use of logic circuits to control the operation of a motor brake. U.S. Pat. No. 4,514,677 which issued to George A. Kaufmann, III et al on Apr. 30, 1985, discloses the use of a timing circuit which operates in two stages and is set at a predetermined level and is not adjustable. U.S. Pat. No. 4,547,692 which issued to Carl P. Spaulding on Oct. 15, 1985, discloses a positional control circuit which has as one of its functions, the ability to brake a motor. U.S. Pat. No. 4,5560,913 which issued to Young K. Min on Dec. 24, 1985, discloses the use of sparkless contacts in a relay operated braking circuit to prolong the life of the relays. U.S. Pat. No. 4,612,490 which issued to Ulrich Kagi on Sept. 16, 1986, discloses the use of a fixed timer circuit and the use of a brake on three phase motors.

While the above mentioned devices are suited for their intended usage, none of these devices discloses the operative features of applicant's invention. Specifically, none of the prior art patents either alone or in concert show the use of a simple electronic circuit to control the braking of an electric motor and furthermore none of the prior art shows the use of a separate mechanism with an adjustable timing circuit which can be retrofitted to almost any electric motor driven device. Inasmuch as the art is relatively crowded with respect to these various types of electric motor brakes, it can be appreciated that there is a continuing need for and interest in improvements to such electric motor brakes, and in this respect, the present invention addresses this need and interest.

SUMMARY OF THE INVENTION

In view of the foregoing disadvantages inherent in the known types of electric motor brakes now present in the prior art, the present invention provides an improved electric motor brake. As such, the general purpose of the present invention, which will be described subsequently in greater detail, is to provide a new and improved electric motor brake which has all the advantages of the prior art electric motor brakes and none of the disadvantages.

To attain this, representative embodiments of the concepts of the present invention are illustrated in the drawings and make use of a simplified circuit which enables there to be a timed injection of DC voltage into the motor windings of an induction motor. This DC voltage will act as a dynamic braking force and will bring the rotor, and whatever is connected to it, to a stop in a rapid fashion. An additional feature of applicant's invention is that it may be constructed and used as a stand alone device which may be attached to any electrical induction motor to achieve the desired braking effect. A further feature of applicant's invention is the fact that it is designed to be user adjusted to achieve the maximum possible effect rather than using a fixed design which would result in a compromise in order to be suited for wide usage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electric motor brake which has all the advantages of the prior art electric motor brakes and none of the disadvantages.

It is another object of the present invention to provide a new and improved electric motor brake which may be easily and efficiently manufactured and marketed.

It is a further object of the present invention to provide a new and improved electric motor brake which is of a durable and reliable construction.

An even further object of the present invention is to provide a new and improved electric motor brake which is susceptible of a low cost of manufacture with regard to both materials and labor, and which accordingly is then susceptible of low prices of sale to the consuming public, thereby making such electric motor brakes economically available to the buying public.

Still yet another object of the present invention is to provide a new and improved electric motor brake which provides in the apparatuses and methods of the prior art some of the advantages thereof, while simultaneously overcoming some of the disadvantages normally associated therewith.

Still another object of the present invention is to provide a new and improved electric motor brake which can be easily adjusted to the desired usage to achieve maximum efficiency.

Yet another object of the present invention is to provide a new and improved electric motor brake which can be easily moved from machine to machine to provide each with the desirable safety features of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
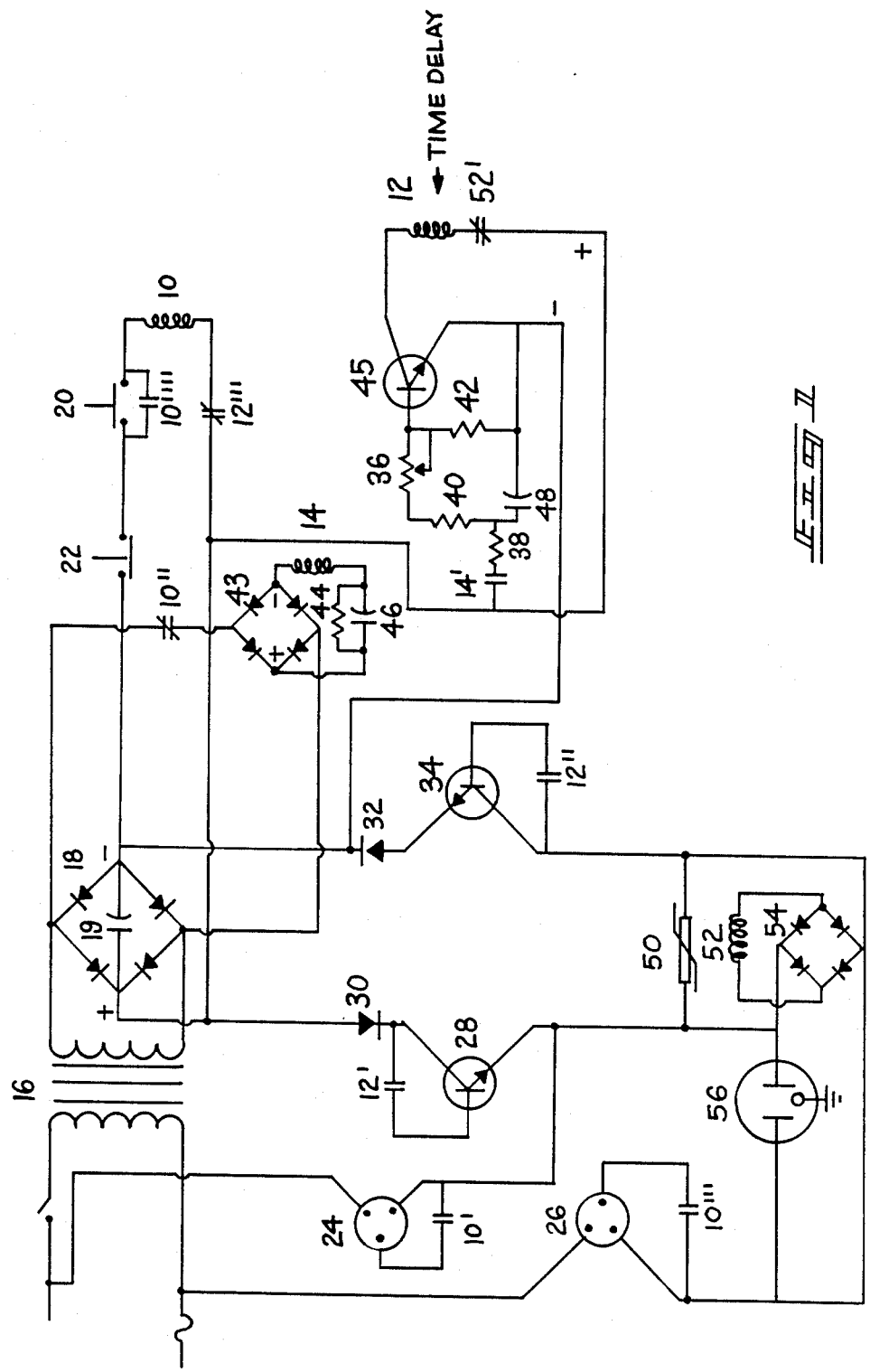
FIG. 1 is a circuit diagram of an electric motor brake design which illustrates the features of applicant's invention.

With reference now to the drawings, and in particular to FIG. 1 thereof, a new and improved electric motor brake embodying the principles and concepts of the present invention will now be described.

The invention consists generally of three main parts, a transformer which reduces the voltage from the available AC source, either mono of polyphasic, and turns it into a DC voltage suitable for the given application. The second part of the invention is a time delay relay which allows the operator to set the time delay of the apparatus to one which is most suited for his or her particular application. The third and last part of the invention is the circuitry needed to send the DC voltage to the windings of the motor, these circuits vary with the embodiments and will be described in detail below.

In FIG. 1, we see the detailed schematic drawing of applicant's invention. As mentioned supra, the invention has three parts, in FIG. 1 the first part is the transformer section 16, connected to a suitable AC source, which reduces the voltage and feeds it to the rest of the circuits. The circuit is activated or deactivated by the on and off switches 20 and 22. The device which is attached to the motor controller is left in the on position since the starting and stopping of the motor will now be controlled by applicant's invention. When start switch 20 is pushed, relay 10 is activated which in turn activates relays 10', 10", 10''' and 10''''. When activated, relays 10' and 10''' provide a biasing flow to the two triacs 24 and 26 which in turn supply the power to the plug 56. Relay 10'''' serves to keep the power on since start switch 20 is only a momentary contact switch. Switch 22 is normaly closed.

Bridge rectifier 18 is one of ordinary design known those of skill in the art. As is also known in the art, the rectifier uses a capacitor 19 to smooth the output of the transformer and the bridge rectifier.

Relay 10" is activated by relay 10, but is a normally closed relay which is opened by the coil and keeps power from flowing to the timer circuit and transistors 28 and 34 before shutoff is desired. When the motor is shutoff by use of switch 22, the flow of current to the relay 10 is cutoff which begins the shutoff procedure.

When relay 10 is shutoff, normally closed relay 10" closes and activates bridge circuit 43, and resistor 44 and capacitor 46 used conventionally, which in turn activates relay 14. When relay 14 is activated, it in turn activates the timer circuit consisting of; resistors 38, 40 and 42; a potentiometer 36 used to adjust the delay by varying the resistance value; and a transistor 45 which, when biased by the timer circuit, activates coil 12. The purpose of the adjustable delay is to allow the user to set the delay to a length of time sufficient to make sure the motor completely stops before the DC is cut off.

When coil 12 is activated, it then activates the remaining parts of the relay 12' and 12" which bias transistors 28 and 34 and connect a DC source to the motor windings through the plug 56, thus stopping the motor. Relay 12''' is normally closed and protects against the reactivation of the circuit until the timer has cut out.

The current will continue to flow until the energy in capacitor 48 is spent. This will cut off the flow of power to relay 12 and cut off power to the two transistors 28 and 34 thereby deactivating the DC flow to the windings. MOV 50 is there to protect the circuit from high voltage transients caused by the collapse of the magnetic field in the motor on shutdown. The bridge circuit 54 and coil 52 protect the circuitry from a direct short in case of failure of the triacs 24 and 26 which would short through the transistors without the protection circuit. If a failure causes power to energize coil 52 it would open normally closed relay 52' and cut off current to coil 12 opening 12' and 12". Keeping transistors 28 and 34 from being biased on. Diodes 30 and 32 prevent AC voltage from reaching the bridge-18-when motor is running.

Figure 2:
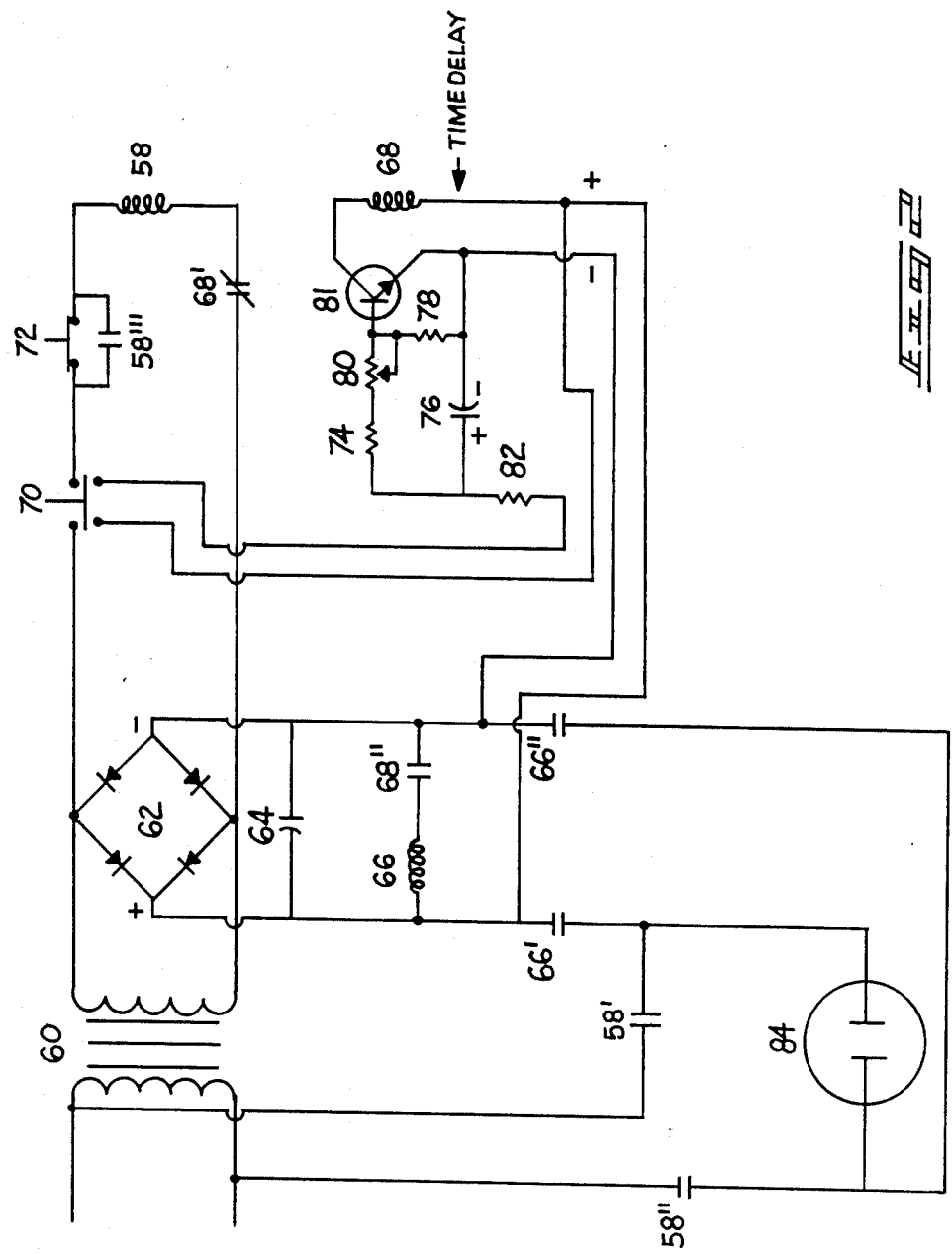
FIG. 2 is a circuit diagram illustrating a second embodiment of applicant's invention which is designed to be used in high power situations.

Turning to FIG. 2, there is shown a second embodiment of the applicant's invention in which the transistors and triacs are replaced by relays. The lone exception is the transistor in the timer section. This is not replaced by a relay since this transistor is not subject to the higher loads the rest of the circuit is designed to accommodate. These modifications would make the device suitable for use in a much broader spectrum. As with the first embodiment, the invention consists of three basic parts, the transformer, the timing circuits and the output stages which supply the DC to stop the motor. The transformer section 60, which is connected to a suitable ac source, supplies power to the rest of the circuit through the conventional bridge rectifier circuit 62. As is common in these circuits a capacitor 64 is used to smooth the waveform of the rectified current.

As with the first embodiment, the power switch of the connected apparatus is left in the on position since the control of power is handled by applicant's invention. The switches 70 and 72 handle the control of the circuit. When switched to the on position, starter switch 72 activates the coil 58 which in turn energizes the flow of AC to the motor by closing relays 58' and 58" and keeps the currant flowing by energizing relay 58'" which bypasses the start switch which is a momentary contact type. Current will continue to flow until such time as the stop switch is opened—said switch being normally closed.

Switch 70 is a break-before-make switch which disconnects power to the motor first and then energizes the timer circuit second. When the timer circuit is energized the resistance network of 82, 74 and 78 in concert with the capacitor 76 and potentiometer 80 serve to bias the transistor 81. As in the previous embodiment, the potentiometer can be adjusted by the user to set the time delay to inject current for just long enough to stop the motor.

This in turn energizes coil 68. Coil 68 then activates relay 68", which then energizes coil 66 which in turn energizes relays 66' and 66" sending DC into the motor windings through plug 84 to stop the motor.

The flow to the windings will end when the energy in capacitor 76 is spent. This will cause the transistor 81 to stop conducting and in turn deenergize coils 68 and 66 and their attendant relays. As with the prior embodiment, safety measures are built into the circuit. In this case, a normally closed relay 68' is used to insure that switch 72 can't be used to reactivate the circuit until the timer circuit has timed out.

Figure 3:
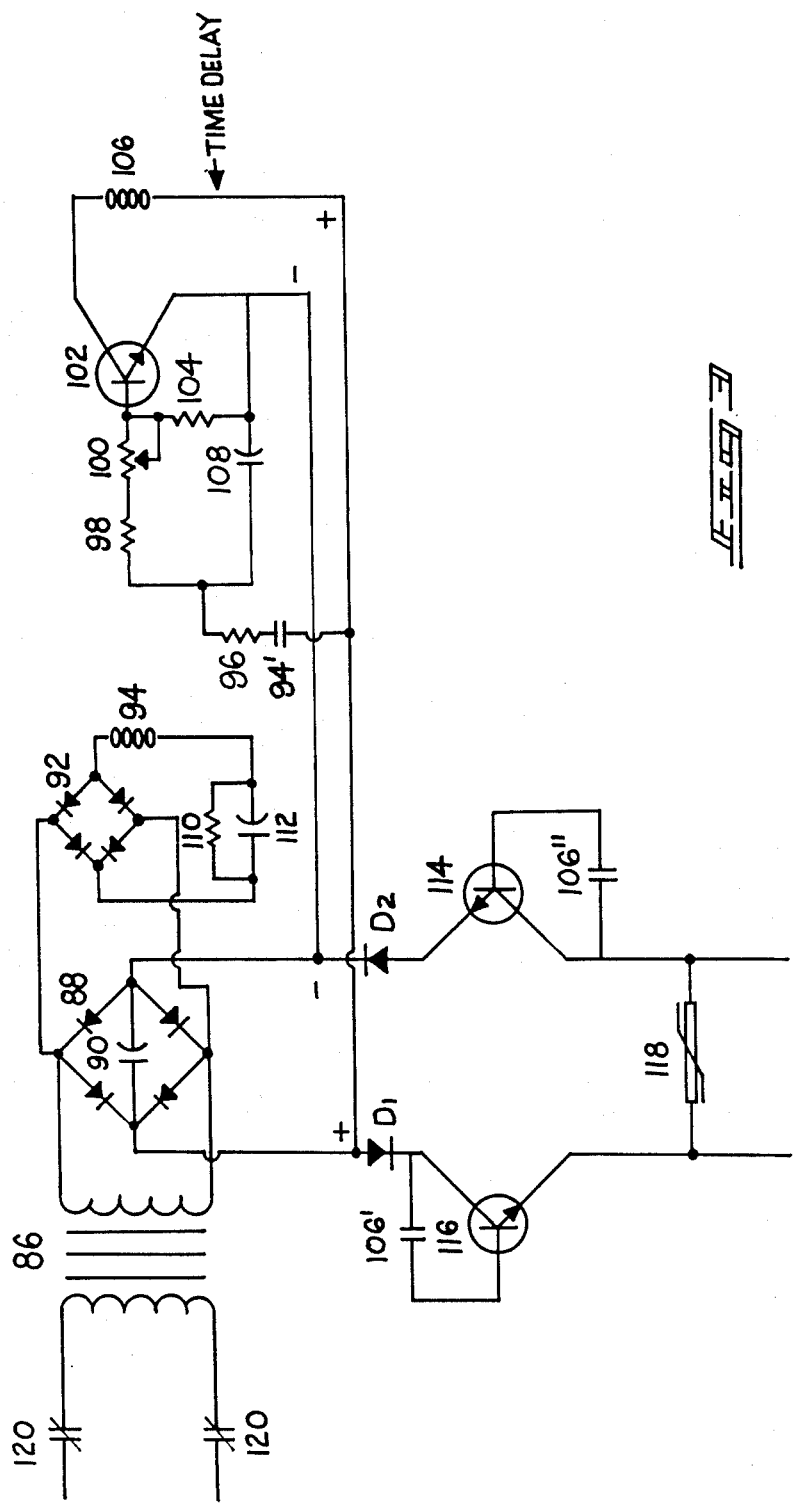
FIG. 3 is a circuit diagram of a third embodiment of applicant's invention designed for permanent use in an electric motor driven device.

FIG. 3 illustrates a third embodiment of applicant's invention in which the circuit is designed to be permanently installed in the motor driven device. Since it is designed to be permanently installed, there is no need to handle the switching of the main power source to the motor since that will be handled by the switches of the unit itself. The circuit does, however, handle the injection of the DC into the motor windings. The actual switching is initiated by the actuation of the off switch on the unit which cuts off the supply to the starter windings. This also cuts off the power to the relays 120 and 120' which are of the normally closed type auxiliary contacts of magnetic starter. When these relays close they connect the transformer 86 to the power connection of the unit, this in turn supplies the power to the rest of the circuit. The power is transmitted to the other circuitry through a pair of bridge rectifiers 88 and 92. Rectifier 88 supplies the DC source for the braking action and rectifier 92 supplies the power to the timing circuitry. Again as is common, each of the rectifiers 88 and 92 has an associated capacitor (90 and 112 respectively) which serve to smooth the waveform coming from the transformer. In addition the bridge circuit 92 has a resistor 110 which serves to bleed the capacitor 112 to speed the recycling time of the circuit between activations.

When the current in the bridge circuit 92 starts to flow, it activates coil 94 which in turn activates relay 94'. This allows current to flow in the timer circuit. When the timer circuit; including resistors 96, 98 and 104; potentiometer 100; and capacitor 108; is active, it allows current to flow through Tr-102 and coil 106 which activates relays 106' and 106". As with the previous designs, the length of the time delay is user adjustable to allow the DC to completely stop the motor before it is shut off. The activation of 106' and 106" will activate the transistors 114 and 116. This injects the DC into the motor windings and causes to motor to brake. As with the previous embodiments, this current flow will continue until the capacitor 108 has fully discharged, at which time the current flow to the coil 106 will stop. This will, in turn, deactivate relays 106' and 106" disabling the braking force.

As with the previous designs, there are safety features in this design. The MOV 118 is present to prevent damage to the circuits caused by the collapse of the magnetic field when the circuits time out.

D1 and D2 are to block AC voltage from circulating through transistors 116 and 114 and bridge 90.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for selectively supplying AC power and DC braking current to an AC electrical motor having a power cord, comprising:
   a transformer;
   means connecting a primary stage of said transformer to an external AC source;
   rectifier means connected to a secondary stage of said transformer for producing a DC source;
   an output plug for supplying current to the AC electric motor through the power cord thereof;
   a pair of triacs connecting said output plug to said primary transformer stage;
   relay means connected to said secondary transformer stage and operatively connected to energize said triacs to allow flow from said primary transformer stage to said output plug;

first switch means connected to said secondary transformer stage for selectively activating said relay means;

second switch means for simultaneously deactivating said relay means, stopping current flow from said primary transformer stage through said triacs to said output plug, and for connecting said DC source to said output plug; and adjustable timing circuit means for regulating the time duration of said DC supplied to said out plug.

2. The device of claim 1, further comprising means connected between said timing circuit and said output plug for eliminating high voltage transients upon shut down of the electric motor.

3. The device of claim 1, further comprising:

transistor means for selectively connecting said DC source to said output plug;

a bridge rectifier connected between said output plug and said transistor means;

a relay coil connected to an output of said bridge rectifier and adapted for energization upon a short circuit; and a plurality of relay contacts activated by energization of said relay coil to prevent said transistor means from being biased on by a short circuit.

4. The device of claim 3, further comprising means connected between said timing circuit and said transistor means for eliminating high voltage transients upon shut down of the electric motor.

* * * * *